US012784145B2

(12) United States Patent
Kwong et al.

(10) Patent No.: US 12,784,145 B2
(45) Date of Patent: Nov. 3, 2026

(54) METHOD AND SYSTEM FOR IMAGE ENHANCEMENT

(71) Applicant: Centre for Intelligent Multidimensional Data Analysis Limited, Pak Shek Kok (HK)

(72) Inventors: Tak Wu Sam Kwong, Pak Shek Kok (HK); Dongjie Ye, Pak Shek Kok (HK); Zhangkai Ni, Pak Shek Kok (HK); Shiqi Wang, Pak Shek Kok (HK)

(73) Assignee: Centre for Intelligent Multidimensional Data Analysis Limited, Pak Shek Kok (HK)

( * ) Notice: Subject to any disclaimer, the term of this patent is extended or adjusted under 35 U.S.C. 154(b) by 375 days.

(21) Appl. No.: 18/456,603

(22) Filed: Aug. 28, 2023

(65) Prior Publication Data

US 2025/0078206 A1 Mar. 6, 2025

(51) Int. Cl.

| | |
|---|---|
| ***G06K 9/00*** | (2022.01) |
| ***G06T 5/60*** | (2024.01) |
| ***G06V 10/44*** | (2022.01) |
| ***G06V 10/60*** | (2022.01) |
| ***G06V 10/771*** | (2022.01) |

(52) U.S. Cl.

CPC ................ *G06T 5/60* (2024.01); *G06V 10/44* (2022.01); *G06V 10/60* (2022.01); *G06V 10/771* (2022.01)

(58) Field of Classification Search

CPC ........... G06T 5/60; G06V 10/44; G06V 10/60

See application file for complete search history.

(56) References Cited

U.S. PATENT DOCUMENTS

2025/0200718 A1* 6/2025 Xiong ........................ G06T 5/50

OTHER PUBLICATIONS

Ye, D., Ni, Z., Yang, W., Wang, H., Wang, S., & Kwong, S. (2023). Glow in the dark: Low-light image enhancement with external memory. IEEE Transactions on Multimedia, 26, 2148-2163. (Year: 2023).*

* cited by examiner

*Primary Examiner* — Molly Wilburn
*Assistant Examiner* — Aidan Keup
(74) *Attorney, Agent, or Firm* — Renner, Kenner, Greive, Bobak, Taylor & Weber

(57) ABSTRACT

A system and a method for a computer implemented method of image enhancement includes the steps of receiving an input image, wherein the input image is a low light image, processing the input image, by a pre trained image enhancer, to generate an initial enhanced image, accessing, from an image memory, a response value corresponding to a sample specific property a normal image, generating an adjustment factor based on the response value from the image memory, generating a final enhanced image by applying the adjustment factor to the initial enhanced image.

20 Claims, 7 Drawing Sheets

METHOD AND SYSTEM FOR IMAGE ENHANCEMENT

TECHNICAL FIELD

The present invention relates to a method and system for image enhancement. In particular, the present invention relates to methods and systems for low light image enhancement.

BACKGROUND

Low light image enhancement i.e., enhancing the images captured in low light is a classic problem in image processing. Several methods have been applied to try and improve the resolution i.e., quality of low light images. Some common approaches have been application of conventional image enhancement deep image approaches, learning enhancement approaches and vision transformer approaches.

Conventional approaches can often be grouped into two categories: 1) histogram equalisation (HE) based methods and 2) Retinex model based methods. The HE based methods adjust the histogram of low light images to a specific mathematical distribution by a global or local operation. HE based methods can often lead to undesirable local illumination and can also suffer from under exposure or over exposure problems since these methods are often not flexible enough for visual content. Retinex model based approaches enhance the images according to Retinex theory. Retinex models can be computationally expensive and often do not produce an ideal result.

Some deep learning approaches have been used for low light image enhancement. LLNet proposes a stacked auto-encoder network to perform enhancement and denoising jointly. Other approaches have used a similar structure to LLNet have end to end networks for low light image enhancement such as for example multi scale frameworks residual learning model, progressive recursive networks. Other deep learning approaches have introduced the Retinex model into deep learning neural networks which usually generate the enhanced image by separately adopting specialised sub networks for illumination and reflectance components of the image. Often deep learning networks have to apply a hyperparameter in order to connect the input low light images with a reference image since the correlation between low light images and reference images is a non one to one relationship. However, most of the setting of the hyperparameter of existing deep learning methods/approaches must be chosen externally (i.e., a ratio that has to be pre calculated and determined by users prior to application of a learning model). This can limit the practical application of deep learning approaches as they require quite a lot of extra computing.

Vision transformers have generally been applied to natural language processing (NLP) in which multi head self attention can excel at handling long range dependencies and context of sequence data. For low level vision tasks, however, the outputs from transformed models always output images rather than labels or boxes in high level vision tasks. This can greatly increase computational cost and time. Transformer models with self attention may be useful for low light image enhancement but current approaches are complex and expensive, and therefore have some challenges with adoption.

SUMMARY OF THE INVENTION

Image enhancement, in particular low light image enhancement has been an ongoing challenge. Several approaches have been tried but still have not yielded ideal results or are computationally taxing. Memory networks are one approach that can produce an enhanced image at a reasonable computational load. The present invention relates to a system and method for image enhancement, in particular low light image enhancement utilising a memory network. The system and method utilise an external memory network.

In an embodiment the present invention relates to a system for image enhancement, in particular for low light image enhancement. The system may comprise image processing network that comprises an image memory. The image memory is configured to store sample specific properties of the training dataset i.e., the image memory is configured to cache sample specific properties of a training dataset of images. The stored sample specific properties can be recalled during testing and/or training of a network to facilitate adaptive adjustments to the testing samples. The adaptive adjustments may be applied to an initial image enhancement output to improve the output and generate a higher quality (i.e., higher resolution) image. The system and method apply an external memory augmented network for low light image enhancement.

The image enhancement method and system according to the present invention enhances low light images to align with normal light images. The enhanced images that are output from the method and system is an enhanced low light image that aligns with a normal light image.

According to a first aspect of the first invention, there is provided a computer implemented method of image enhancement comprising the steps of:

receiving an input image, wherein the input image is a low light image, processing the input image, by a pre trained image enhancer, to generate an initial enhanced image, accessing, from an image memory, a response value corresponding to a sample specific property a normal image, generating an adjustment factor based on the response value from the image memory, generating a final enhanced image by applying the adjustment factor to the initial enhanced image.

In an embodiment the adjustment factor is generated based on combining the response value with global average pooling data related to the initial enhanced image.

In an embodiment the adjustment factor is generated by applying an adaptive fusion function.

In an embodiment the step of applying an adaptive fusion function comprises:

calculating a ratio of a sample specific property calculating a global average pooling data through element wise division, concatenating the sample specific property and the global average pooling data, to generate a concatenated value, determining one or more weight vectors by applying a softmax function to the concatenated value, deriving the adaptive adjustment factor based on the one or more weight vectors and the ratio of the sample specific property and global average pooling data.

In an embodiment the step of deriving the adaptive adjustment factor comprises: multiplying a first weight vector by the ratio of the sample specific property and global average pooling data and summing with a second weight vector, and wherein the first weight vector corresponds to the sample specific property and the second weight vector corresponds to the global average pooling data.

In an embodiment the method of image enhancement comprises additional steps of:

processing the input image, by a feature generator, to generate a query feature, accessing the response value, from the image memory, based on the query feature.

In an embodiment the query feature is generated by feedforwarding the input image into a pre-trained feature generator.

In an embodiment the pre-trained feature generator is a ResNet-18 network.

In an embodiment the method of image enhancement comprising the steps of:

identifying a memory key that corresponds to the query feature, within the image memory, identifying a response value that corresponds to the identified memory key, accessing the response value from a memory address of the image memory that corresponds to the memory key.

In an embodiment the memory key is identified from a plurality of memory keys, by computing the cosine similarity between the query and the plurality of memory keys to identify the memory key that has the closest cosine similarity to the query.

In an embodiment the image enhancer is a pre-trained transformer based image enhancer comprising a symmetric encoder—decoder comprising four level pyramid feature maps with skip connections.

In an embodiment the step of processing the input image by the image enhancer comprises the steps of:

the input image is fed into a first convolution layer, extracting one of more low-level features by processing the input image by the first convolution layer, wherein each low level feature is defined by a size that comprises spatial dimensions and a number of channels, the one or more low level features are passed through a 4-level symmetric encoder-decoder, generating an initial enhanced image from the 4-level symmetric encoder-decoder.

In an embodiment the method of image enhancement comprises a memory writing process comprising the steps of:

receiving the response value corresponding to the query feature, obtaining a desired memory value from processing a reference image, updating one or more memory keys within a dictionary using the response value, the one or more memory keys are updated if the difference between the response value and the desired memory value is within a threshold.

In an embodiment the method is applied to low light images to enhance the low light images, and the image memory comprises a plug and play mechanism for integration into an image enhancement method.

According to a second aspect of the present invention, there is provided a system for image enhancement comprising:

an image enhancement processor, an image memory arranged in communication with the image enhancement processor, the image memory defining a memory dictionary, the memory dictionary comprising one or more memory keys and one or more response values, each memory key corresponding to a response value, wherein the response value corresponds to a value from a normal image, wherein the image enhancement processor is configured to:

receive an input image, wherein the input image is a low light image, process the input image, by a pre trained image enhancer, to generate an initial enhanced image, access, from the image memory, a response value corresponding to a sample specific property of a normal image, generate an adjustment factor based on the response value from the image memory, output a final enhanced image by applying the adjustment factor to the initial enhanced image.

In an embodiment the image enhancement processor comprising a learning network, the learning network comprising:

a pre trained image enhancer adapted to receive one or more input images and generate the initial enhanced image, a pre-trained feature generator configured to receive the one or more input images and generate a query feature based on feedforwarding the one or more input images into the feature generator, a memory reading module configured to receive the query feature and access the response value from the image memory based on the received query feature, an adaptive fusion module configured to receive the response value and generate the adjustment factor based on the response value, an output module configured to apply the adjustment factor to the initial enhanced image and output the final enhanced image.

In an embodiment the image enhancement processor is configured to:

generate global average pooling data from the initial enhanced image, the adaptive fusion module is configured to:

receive global average pooling data and a response value from the memory reading module generate the adjustment factor based on combining the response value with global average pooling data related to the initial enhanced image, and; wherein the adaptive fusion module is configured to apply an adaptive fusion function to generate the adjustment factor.

In an embodiment the adaptive fusion module is further configured to:

calculate a ratio of a sample specific property and the global average pooling data through element wise division, concatenate the sample specific property and the global average pooling data, to generate a concatenated value, determine one or more weight vectors by applying a softmax function to the concatenated value, derive the adaptive adjustment factor based on the one or more weight vectors and the ratio of the sample specific property and global average pooling data.

In an embodiment the adaptive fusion module, as part of generating the adaptive adjustment factor, is configured to:

multiply a first weight vector by the ratio of the sample specific property and global average pooling data and summing with a second weight vector, wherein the first weight vector corresponds to the sample specific property and the second weight vector corresponds to the global average pooling data.

In an embodiment the image enhancer is a pre-trained transformer based image enhancer comprising a symmetric encoder—decoder comprising four level pyramid feature maps with skip connections.

In an embodiment the memory reading module is further configured to:

identify a memory key that corresponds to the query feature, within the image memory, identify a response value that corresponds to the identified memory key, access the response value from a memory address of the image memory that corresponds to the memory key.

In an embodiment the memory reading module is configured to:

compute the cosine similarity between the query and the plurality of memory keys, identify the memory key from a plurality of memory keys based on the output of the cosine similarity computation, wherein the memory key is identified as the memory key having the closest cosine similarity to the query.

In an embodiment the image enhancer is further configured to:

feed the received input image into a first convolution layer, process the input image by applying the first convolution layer, extract one or more low level features based on the processing in the first convolution layer, wherein each low level feature is defined by a size that comprises spatial dimensions and a number of channels, pass the one or more low level features are through a 4-level symmetric encoder-decoder, generate an initial enhanced image from applying the 4-level symmetric encoder-decoder.

In an embodiment the system comprises a display, the display arranged in electrical communication with the image enhancement processor and configured to receive the output of enhanced images and display the enhanced images.

According to a third aspect of the present invention, there is provided a system for low light image enhancement comprising:

a computing apparatus comprising an image enhancement processor, an image memory comprising sample specific properties of a training set of images, wherein the sample specific properties relate to enhancement information for low light images, wherein the image enhancement processor is configured to implement a memory augmented network configured to execute a memory enhancement method as described earlier. The method may comprise any one or more of the method steps described in the first aspect above.

In an embodiment the image memory is incorporated memory unit that is configured for plug and play into the computing apparatus such that the processor can access data from the external memory.

According to a fourth aspect of the present invention, there is provided a machine learning network for image enhancement, in particular for use in executing the method and any of its steps as described above, comprising:

a pre trained image enhancer, the pre-trained enhancer comprising a symmetric encoder—decoder comprising four level pyramid feature maps with skip connection, and each level of encoder—decoder comprises multiple transformer blocks including layer norm layers, multi head channel self attention module and a feedforward network, a Res-net 18 feature generator, a pre-trained image memory defining a memory dictionary, the memory dictionary comprising one or more memory keys and one or more response values, each memory key corresponding to a response value, wherein the response value corresponds to a value from a normal image, an adaptive fusion module in communication with the memory image and the pre-trained image enhancer, the one or more input images being processed in parallel, wherein a first parallel path of the network comprising the pre-trained image enhancer and the second parallel path comprising the Res-net 18 feature and the image memory, the outputs from the first and second paths being fed into the adaptive fusion module.

The machine learning network may be configured to implement or execute any of the method steps described in reference to the first aspect, as described above.

According to a further aspect of the present invention, there is provided an image enhancement processor for low light image enhancement to generate an enhanced image, wherein the image enhancement t processor configured to communicate with an image memory, wherein the image enhancement processor is configured to carry steps of the method of image enhancement as described earlier. In one example the image enhancement processor may be configured to execute the method steps in accordance with the first aspect described above.

According to a further aspect of the present invention, there is provided a computer readable medium comprising instructions for low light image enhancement, which when executed by a computing apparatus cause the computing apparatus to carry out the method for image enhancement as described above. The method for image enhancement may be the method as described in the first aspect above.

According to a further aspect of the present invention there is provided a method of training a machine learning network for image enhancement comprising:

receiving the response value corresponding to the query feature, obtaining a desired memory value from processing a reference image, updating one or more memory keys within a dictionary using the response value, the one or more memory keys are updated if the difference between the response value and the desired memory value is within a threshold.

In an embodiment the training method is applied to a learning network as described above.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENTS

The present invention relates to a method and system for image enhancement. In particular, the present invention may also relate to methods and systems for image processing to enhance images. Embodiments of the present invention may also relate to methods and systems for low light image enhancement i.e., enhancing images that have low light to generate enhanced images of a higher quality i.e., a higher resolution.

In one example embodiment, the system for image enhancement may comprise an image enhancement processor and an image memory. The image memory may comprise a separate (i.e., external) memory unit that is configured to store sample specific properties. The sample specific properties relate to a desired value from the normal light image. The desired value relates to an enhanced value of a normal light image. The image memory may define a memory dictionary. The memory dictionary comprising one or more memory keys and one or more response values, each memory key corresponding to a response value, wherein the response value corresponds to a value from a normal image. The image memory may be an external memory. The image memory may be implemented as a plug and play mechanism.

The computing apparatus may be configured to implement a learning network i.e., an AI model or a machine learning network for image enhancement. The image processor may be configured to apply or execute the network. The machine learning network is programmed for use in enhancing low light images. The machine learning network may be configured to receive low light images and enhance them to output enhanced images. The low light images may be low resolution images. These low light images may correspond to images captured in low light conditions. The learning network is configured to apply the stored values from the image memory as part of the processing to enhance the low light images. The learning network may be configured to apply the sample specific properties stored in the image memory to facilitate adaptive adjustments to the testing samples. The enhanced image may be a higher resolution image than the low light image. The enhanced image may be a normal light image, i.e., an image that may correspond to an image captured in normal light.

The learning network may be configured to apply or utilise the stored values in the image memory during testing to re-enhance already enhanced images to further improve quality.

Figure 1:
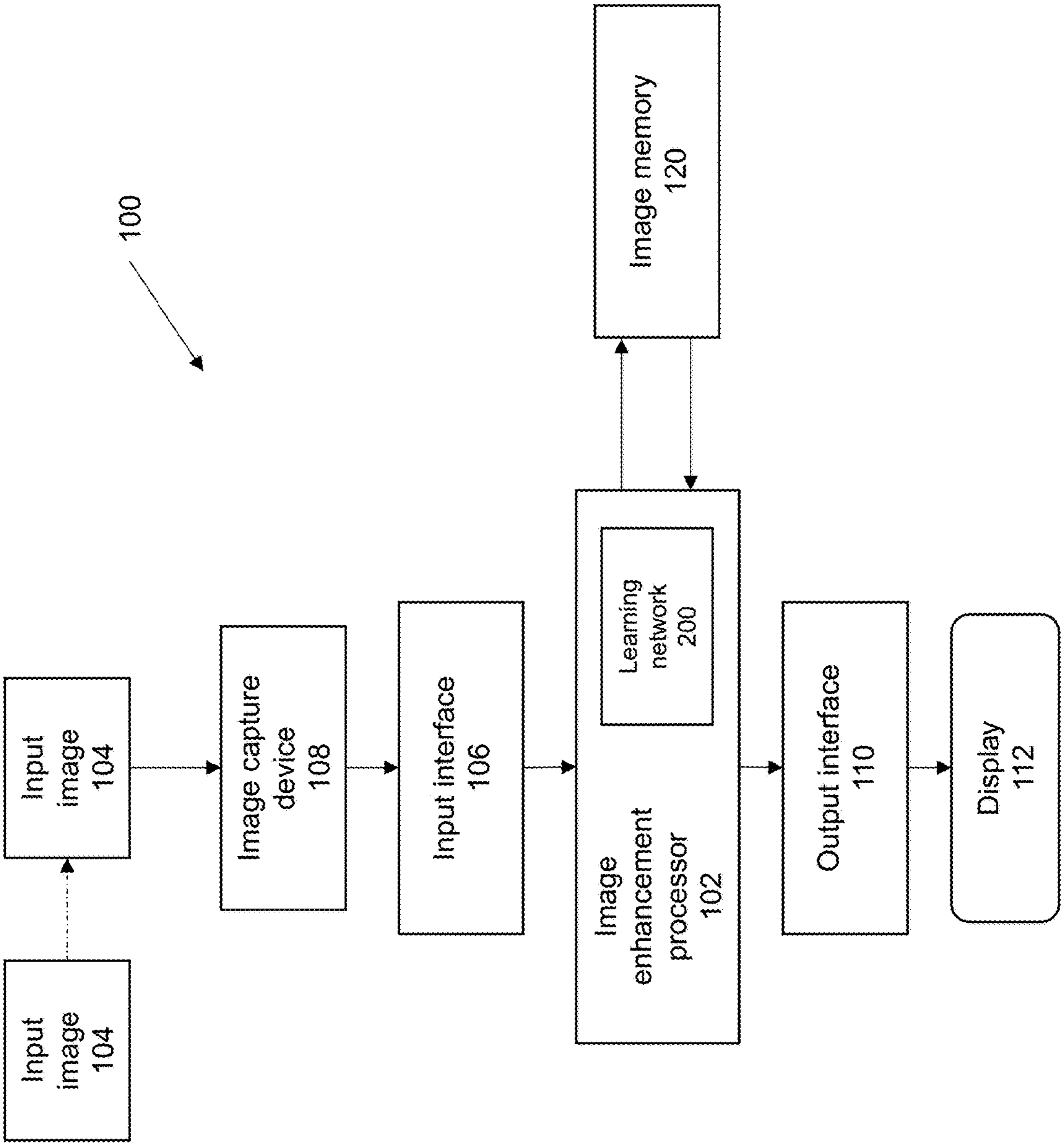
FIG. 1 is a illustrated a block diagram of an embodiment of a system for image enhancement.

Referring to FIG. 1, there is illustrated a block diagram of an embodiment of a system 100 for image enhancement. The system 100 is particularly suited for low light image enhancement to output enhanced, higher quality (i.e., higher resolution) images from received low light images.

The system 100 comprises an image enhancement processor 102, an input interface 104, an output interface 106 and an image memory 120. The system 100 may be configured to implement a method for image enhancement, in particular for low light image enhancement.

The system 100 and method are configured to receive an input low light image, process the input image, by a pre trained image enhancer, to generate an initial enhanced image; access, from the image memory, a response value corresponding to a sample specific property a normal image; generate an adjustment factor based on the response value from the image memory; and generate a final enhanced image by applying the adjustment factor to the initial enhanced image. The input low light image may be received through the input interface. The enhanced image may be outputted via the output interface.

In an example embodiment, the system and method for image enhancement may be implemented in software, hardware, firmware or a combination of both on a computing apparatus.

The computing apparatus (i.e., computing device or computing system) may be implemented by any computing architecture, including portable computers, tablet computers, stand-alone Personal Computers (PCs), smart devices, Internet of Things (IOT) devices, edge computing devices, client/server architecture, "dumb" terminal/mainframe architecture, cloud-computing based architecture, cameras, smartphones, wearable devices with cameras, road surveillance equipment, drones or any other appropriate architecture. The computing device may be appropriately programmed to implement the system 100 and method for low light image enhancement. In one example the The computing apparatus includes suitable components necessary to receive, store and execute appropriate computer instructions. The components may include a processing unit such as for example one or more of a Central Processing Unit (CPU), Math Co-Processing Unit (Math Processor), Graphic Processing Unit (GPUs) or Tensor Processing Unit (TPUs) for tensor or multi-dimensional array calculations or manipulation operations, read-only memory (ROM), random access memory (RAM), and input/output devices such as disk drives, input devices such as an Ethernet port, a USB port, etc. Display such as a liquid crystal display, a light emitting display or any other suitable display and communications links. The computing apparatus may include instructions that may be included in ROM, RAM or disk drives and may be executed by the processing unit. There may be provided a plurality of communication links which may variously connect to one or more other computing devices such as for example a server, personal computers, terminals, wireless or handheld computing devices, Internet of Things (IoT) devices, smart devices, edge computing devices. At least one of a plurality of communications link may be connected to an external computing network through a telephone line or other type of communications link.

The computing apparatus or computer may include storage devices such as a disk drive which may encompass solid state drives, hard disk drives, optical drives, magnetic tape drives or remote or cloud-based storage devices. The computing device may use a single disk drive or multiple disk drives, or a remote storage service. The computing apparatus may also have a suitable operating system which resides on the disk drive or in the ROM.

The computing apparatus (i.e., computer or computing device) may also provide the necessary computational capabilities to operate or to interface with a machine learning network, such as a neural network, to provide various functions and outputs. The neural network may be implemented locally, or it may also be accessible or partially accessible via a server or cloud-based service. The machine learning network may also be untrained, partially trained or fully trained, and/or may also be retrained, adapted or updated over time. In one example the computing apparatus as described herein may be a smartphone or a digital camera that comprises the components described herein and may implement the system 100 and method 300 for image enhancement.

In this embodiment, the system for image enhancement 100 may be implemented to comprise: an image enhancement processor, an image memory arranged in communication with the image enhancement processor, the image memory defining a memory dictionary, the memory dictionary comprising one or more memory keys and one or more response values, each memory key corresponding to a response value, wherein the response value corresponds to a value from a normal image, and wherein the image enhancement processor is configured to:

receive an input image, wherein the input image is a low light image, process the input image, by a pre trained image enhancer, to generate an initial enhanced image, access, from the image memory, a response value corresponding to a sample specific property a normal image, generate an adjustment factor based on the response value from the image memory, output a final enhanced image by applying the adjustment factor to the initial enhanced image.

As shown in FIG. 1, the system for image enhancement, in particular for low light image enhancement includes an image enhancement processor 102 arranged to receive one or more input images 104 from an input interface 106. The input interface 106 is in electrical communication with the image enhancement processor 102. The image enhancement processor 102 is a processing unit having a structure as described earlier.

The input interface 106 is configured to electrically link to an image capture device 108 such as for example a camera or a smartphone. The input interface 106 is arranged in communication with the image capture device 108. Alternatively, the input interface 106 may receive one or more images from an image source such as a server, file system, cloud system, an external disk drive such as a portable hard drive or a data carrying media such as a CD or DVD. Optionally the system 100 may comprise an image capture device 108. The input interface 106 is configured to receive images 104 and transfer these to the image enhancement processor 102 for enhancement. The input images may be still images or a video stream or moving images.

In a typical operation scenario, the input images 104 may be low light images i.e., images captured in low light. The images can be of anything such as for example night photographs, backlit photographs, road surveillance photos in low light, land surveying images in low light etc.

The system 100 further comprises an output interface 110 (i.e., output module). The output interface 110 is configured to receive and output the enhanced image from the image enhancement processor 102. The output interface 110 may transmit the enhanced images to another remote device e.g., via the one or more communication links. Optionally, the output interface 110 may communicate the enhanced images to a display 112 (i.e., a user interface) for presentation to a user.

The image enhancement processor 102 is configured to communicate with an image memory 120 to receive enhancement data i.e., a response value corresponding to a sample specific property of a normal image.

The image memory 120 may be a computer readable medium or a machine readable medium that is configured to store data. The image memory 120 is configured to communicate with the image enhancement processor 102 and any one or more learning networks to provide the stored data.

The image memory 120 may be a plug and play mechanism that can be used with the image enhancement processor 102 for low light image enhancement. The image memory 120 may be an external unit and is part of the system 100 for image enhancement. The image memory 120 may be stored in a plug and play mechanism (i.e., plug and play device) such as for example a USB or a portable hard drive or other disk drive. The image memory 120 may be structure to removably connect to an input device of the computing apparatus implementing the system 100 for image enhancement.

Alternatively, the image memory 120 may be stored in a remote source and may be electronically downloadable e.g., downloaded from an electronic storage such as a server or a cloud system or a remote memory. The image memory may be accessed directly from a remote source using a suitable protocol e.g., a file transfer protocol (FTP).

The image enhancement processor 102 is configured to process the received input images and generate an initial enhancement image. The initial enhanced image is an enhanced low light image. The image enhancement processor 102 is configured to access the response value and generate an adjustment factor based on the response value extracted from the image memory 120. The adjustment factor is used to adjust the initial enhanced image i.e., to re-enhance the initially enhanced image. The image enhancement processor 102 is configured to output a final enhanced image. The final enhanced image is the initial enhanced image that has been further enhanced by applying the adjustment factor.

The system 100 for image enhancement is configured to apply a learning network for image enhancement. The image enhancement processor 102 may be implemented by or may comprise a suitable learning network or a machine learning arrangement, such as for example an external memory enhanced network that may be trained by using a suitable training data set. Optionally, the learning network may comprise a plurality of sub learning networks or sub machine learning arrangements that may operate together to define the learning network. The processor 102 may implement the sub learning networks or sub machine learning arrangements. The training process may include provision of the training data, which may in the form of image pairs. The image pairs may comprise a low light image and a corresponding reference image. The reference image may be a normal light image. The learning network may be trained to enhance an image based on the image pair data.

The image memory 120 may capture sample specific properties of the training dataset to further guide enhancement. The system 100 may be configured to execute a memory writing process during the training phase in which a memory dictionary is defined. The memory dictionary may comprise one or more memory keys and one or more response values. Each memory key corresponds to a response value. The response value corresponds to a value from a normal image i.e., sample specific property of a normal image. The image memory 120 may alternatively, be pre-trained by a separate training process using the training dataset, independent of training the learning network.

Figure 2:
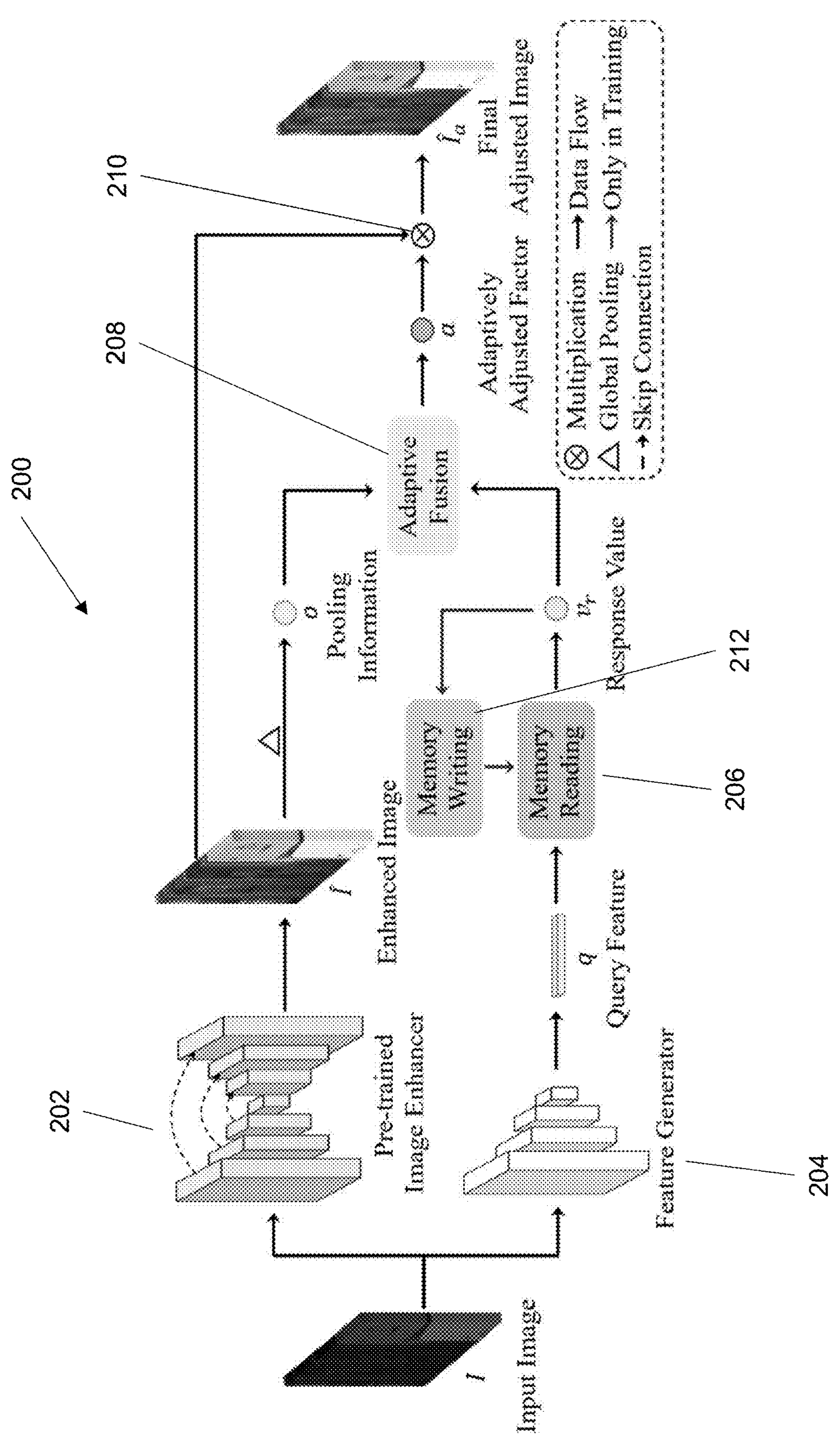
FIG. 2 there is illustrated a block diagram of a learning network that is used in the image enhancement processor.

The system 100 produces an improved enhanced image as it cab benefit from the learned response values (i.e., normal image values) which are used as an adjustment factor for further re-enhancement. The external image memory 120 allows for more complex distributions of reference images in the entire dataset to be remembered to facilitate the adjustment of the testing samples or input images more adaptively. The image memory may be implemented as a plug and play mechanism such that it may be integrated into any existing image enhancement methods or systems to further improve enhancement quality With reference to FIG. 2, there is illustrated a block diagram of a learning network 200 that is used in the image enhancement processor 102. The learning network 200 may comprise an external memory augmented network, as shown in FIG. 2. The processor 102 may be implemented with the external memory augmented network 200 to perform the various functions of the processor. The learning network may implement the method of image enhancement describe herein.

The learning network 200 includes a pre trained image enhancer 202, a pre trained feature generator 204, a memory reading module 206, an adaptive fusion module 208, an output module 210. Optionally, the learning network 200 may further comprise a memory writing module 212. The memory reading module 206 and memory writing module 212 are arranged to communicate with the image memory The image enhancement processor 102 may be configured to implement the pre trained image enhancer 202. The pre trained image enhancer 202 may be configured to receive one or more input images (low light images) and generate the initial enhanced image. The pre-trained image enhancer may be a pre trained low light image enhancement model. In one example the pre trained image enhancer 202 may be a image enhancer is a pre-trained transformer a symmetric encoder—decoder comprising four level pyramid feature maps with skip connections.

Referring to FIG. 2, the pre trained image enhancer 202 processes the input images I to generate the enhanced image $\hat{I}$. The processor 102 is configured to calculate a global average pooling data o. The global average pooling data is calculated from the enhanced images $\hat{I}$, and obtained for further adaptive fusion.

The pre-trained feature generator 204 is configured to receive the one or more input images (low light images) I and generate a query feature based on feedforwarding the one or more input images into the feature generator 204. The feature generator may be a pre trained ResNet-18 model. The ResNet-18 model takes the low light image I, and output a query feature q.

The memory reading module 206 is configured to receive the query feature q and access the most relevant response values $v_r$ from the memory dictionary based on the query feature q. The response values $v_r$ are read from the image memory 120, as part of a memory reading process described in reference to FIG. 3. During the training phase the response values $v_r$ are fed into the memory writing module 212 to update the memory dictionary.

The adaptive fusion module 208 is configured to receive the response values $V_r$ and generate an adjustment factor a (i.e., adjusted factor) based on the response values $v_r$. The adaptive fusion module 208 is configured to fuse the response values $v_r$ and the global average pooling data o. The output module 210 is configured to apply the adjustment factor a to the initial enhanced image $\hat{I}$ (or images) and output the final enhanced image $I_a$. The output module 210 may be configured to tune the initial enhanced images $\hat{I}$ adaptively based on the expression $I_a=\hat{I}\cdot a$ to make the initial enhanced image align with normal light images. The output module 210 may be a summing block.

Figure 3:
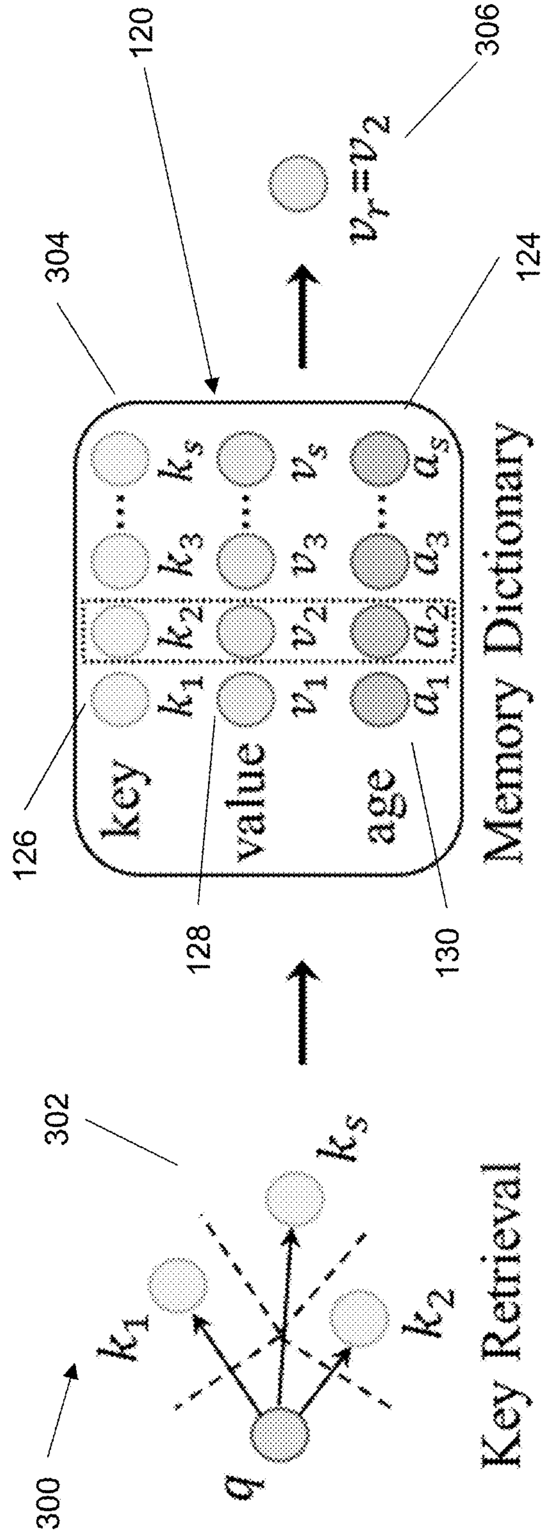
FIG. 3 illustrates a block diagram of the image memory and its contents, as well as the memory reading process to extract appropriate response values from the memory.

FIG. 3 illustrates a block diagram of the image memory 206 and its contents. FIG. 3 further illustrates the memory reading process 300 to extract appropriate response values $v_r$. Referring to FIG. 3 a memory dictionary 124 is defined and stored in the image memory 120. The memory dictionary 124 consists of one or more memory keys. The memory key is defined as $k_i \in \mathbb{R}^{c_k}$, and the memory value (i.e., response value) is defined as $v_i \in \mathbb{R}^{c_v}$. Additionally, a memory age is defined as $a_i \in \mathbb{R}^1$, where $c_k$ is the dimension of $k_i$, $c_v$ is the dimension of $v_i$, $1 \le i \le s$, and s is the memory size. The entire memory dictionary 124 contains three terms that can be denoted as: M=(K,V,A) (1) Where, $K=\{k_1, k_2, \ldots, k_s\}$, $V=\{v_1, v_2, \ldots, v_s\}$, and $A=\{a_1, a_2, \ldots, a_s\}$. Optionally the memory dictionary 124 may be defined as a matrix.

The memory dictionary 124, as shown in FIG. 3 comprises a memory key 126 (K), a response value 128 (V), and an age value 130 (A). The key values i.e., keys 126 may define the specific memory addresses. The response values 128 corresponds to a value from a normal image i.e., sample specific property of a normal image. The age value 130 defines the age of the specific data stored in relation to a particular key.

The K of the memory stores information about the high level features of the input images (i.e., the input data), while also serving as an address that corresponds to both V and A components. The memory dictionary M stores the desired value from the normal light image m, which is used to generate an adaptively adjusted factor (i.e., the adjustment factor) later. Both K and V components of the memory are extracted from the training data. The A of the data points in the memory dictionary is utilised for memory updating to track the age of the data.

The memory reading module 206 is further configured to identify the specific memory key $k_i$ that corresponds to the input query q as shown at step 302, in FIG. 3. The memory reading module 206 is configured to compute the cosine similarity between the query q and the plurality of memory keys $k_i$. The appropriate memory key is identified from the plurality of memory keys based on the output of the cosine similarity computation. The memory key is identified as the memory key having the closest cosine similarity to the query.

The query feature q is acquired by feedforwarding the input low light image I into the pre trained feature generator 204. In one example the pre trained feature generator 204 is a ResNet-18 model. The dimension of the query q is the same as K. Given the query q and K, a cosine similarity between the query q and the i-th memory key $k_i$ is identified to find the most relevant memory key $k_r$. The following equation can be used to determine the cosine similarity:

$$k_r = \operatorname{argmax}_i \frac{qk_i^T}{\|q\|\|k_i\|}.$$

The memory reading module 206 is configured to identify an appropriate response value (i.e., memory value) $v_r$ that corresponds to the identified memory key $k_i$ at step 304. More specifically, the memory reading module 206 is configured to retrieve the most relevant memory element in the memory dictionary M that corresponds to the identified memory key $k_i$.

The memory reading module 206 is configured to access the response value $v_r$ from a memory address of the image memory (i.e., memory dictionary M) that corresponds to the memory key, at step 306. As shown in FIG. 3, the appropriate response value is $v_2$. The response value $v_r=v_2$ as shown in FIG. 3. The response value is accessed from the memory dictionary M which is stored in the image memory.

Figure 4:
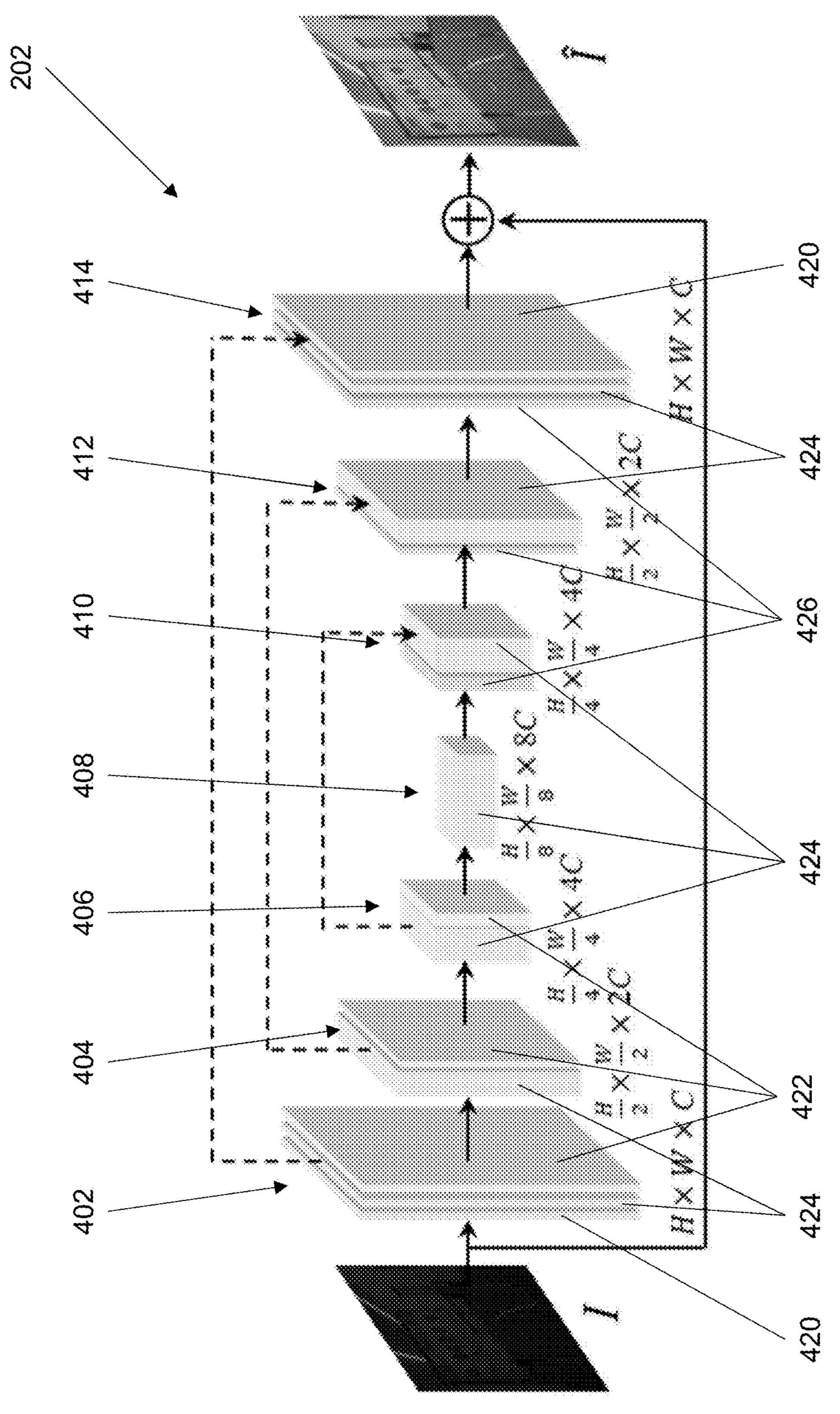
FIG. 4 illustrates an example of the pre trained image enhancer used as part of the system for image enhancement.

The image enhancer 202 may be a pre trained model. The pre-trained model may be an optimised model that may not require any further training. FIG. 4 illustrates an example of the pre trained image enhancer 202. As shown in FIG. 4, the image enhancer 202 is a transformer image enhancer. In the illustrated form of FIG. 4 the image enhancer employs a symmetric encoder-decoder architecture that has a four level pyramid feature maps with skip connection.

As shown in FIG. 4, the image enhancer comprises a initial convolution block 402, which serves as an input block. The image enhancer further comprises a first downsampling transformer block 404, a second downsampling transformer block 406, a central transformer block 408, a first upsampling transformer block 410, a second upsampling transformer block 412 and an output block 414.

The convolution block 402 may comprise a convolution layer 420. The convolution block 402 may also comprise a downsample layer 422. Each of the downsampling transformer blocks comprise a transformer layer 424 and a downsampling layer 422. The central transformer block comprises just a transformer layer 424. The upsampling transformer blocks comprise a transformer layer 424 and upsampling layers 426. The output block 412 may comprise an upsampling layer 426, a transformer layer 424 and a convolution layer 420. As shown in FIG. 4, the blocks define the symmetric decoder-encoder architecture having four level pyramid feature maps with skip connections between the various blocks (i.e., levels).

In one example the pre trained image enhancer 202 may be configured to feed the received input image into a first convolution layer. The image enhancer 202 is configured to process the input image by applying the first convolution layer, and extract one or more low level features based on the processing in the first convolution layer. Each low level feature may be defined by a size that comprises spatial dimensions and a number of channels. The image enhancer 202 is further configured to pass the one or more low level features are through a 4-level symmetric encoder-decoder. The image enhancer 202 is configured to generate an initial enhanced image from applying the 4-level symmetric encoder-decoder FIG. 4 further illustrates the process for an input image as it processed by the pre trained image enhancer. Given an input image 104 defined as $I \in R^{H \times W \times 3}$, the convolution block 402 is configured to receive and process the image. A 3×3 convolution layer is first applied to process the input image 104 at the convolution block 402 to extract the low-level feature with size of $R^{H \times W \times C}$. H×W denotes the spatial dimensions and C is the number of channels.

The extracted feature passes through a 4-level symmetric encoder-decoder to obtain the enhanced image $\hat{I}$. The 4-level symmetric encoder-decoder structure comprises the blocks 402-414 as described earlier. There may be a 2× downsampling/upsampling rate between each two level encoder/decoder structure. The feature downsampling/upsampling processing is implemented by pixel-unshuffle and pixel-shuffle operations. Other alternative processing methods may be used.

The image enhancer may exhibit a hierarchical structure to process the multi-scale feature. The encoder gradually decreases the resolution while expanding the channel capacity, starting with high-resolution input. The decoder takes low-resolution features at the bottleneck as input, gradually generates high-resolution features, and passes them through a convolution layer to generate residual image.

To aid in the recovery process, skip connections may be utilised by concatenating the encoder and decoder features at each level and adding the residual image to the input image to obtain the enhanced output $\hat{I}$. In each level of encoder-decoder (i.e. each block 402-414), multiple transformer blocks may be contained, where including layer norm layers, multi-head channel self-attention module and a feedforward network (FFN).

Figure 6:
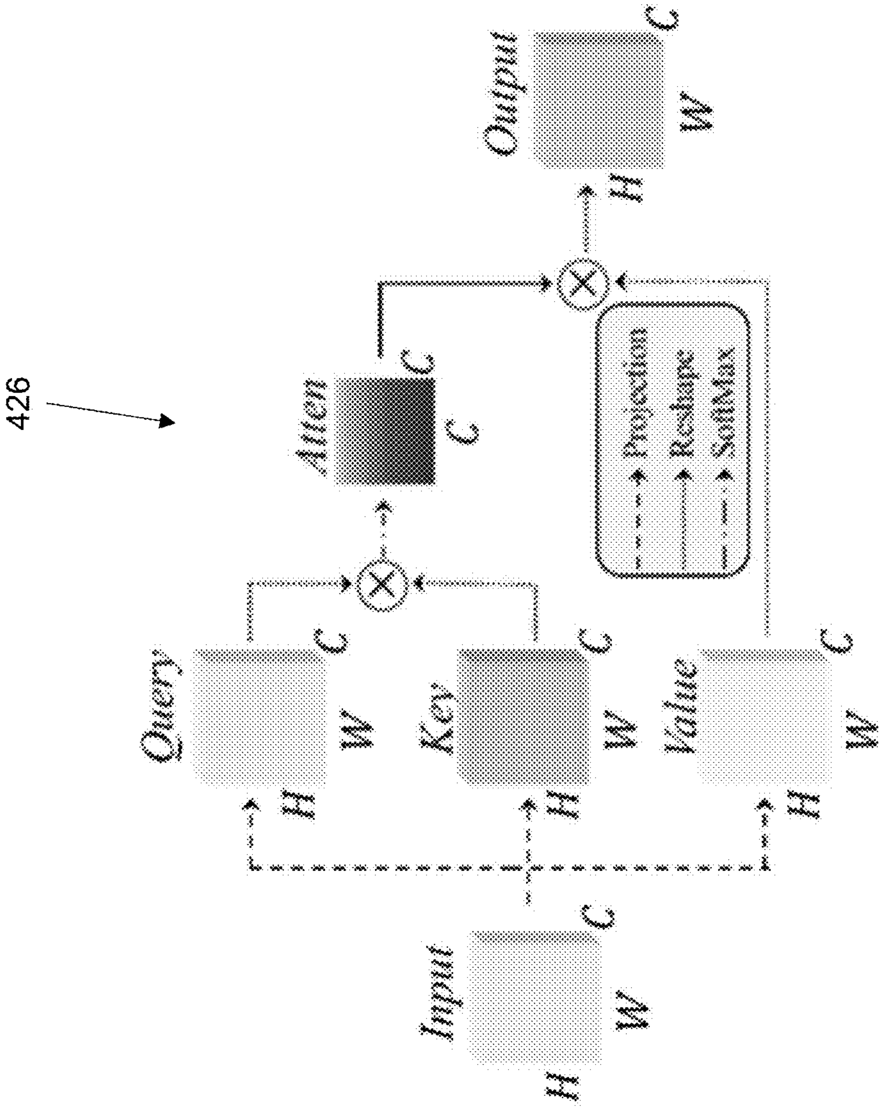
FIG. 6 illustrates an example of the multi head channel self attention module (MCSA) that is used as part of the transformer layer.
Figure 5:
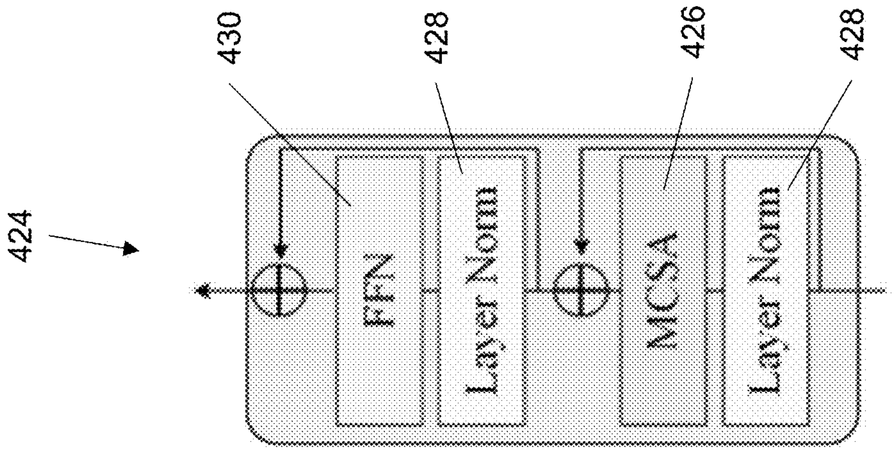
FIG. 5 illustrates the details of the transformer layers used in the pre trained image enhancer.

FIG. 5 illustrates the details of the transformer blocks 424 (i.e., transformer layers). As shown in FIG. 5, each level includes a self attention module 426, multiple layer norms 428, and a feedforward network 430. In one example form shown in FIG. 5, the encoder-decoder i.e., transformer block has two layer norms 428. Any suitable transformer block structure can be used. FIG. 6 illustrates an example of the multi head channel self attention module 426 (MCSA) that is used as part of the transformer layer 424. FIG. 6 illustrates example functions of the self attention module 426 and how an input is resolved into an output. Any suitable self attention module structure can be used as part of the transformer blocks i.e., the encoder decoder.

In one example the input feature may comprise the size $R^{H \times W \times C}$. The input feature passes through a convolutional projection to generate the query, key, and value of the transformer. Instead of conducting the self-attention along the spatial dimensions that lead to the complexity of $O(H^2W^2)$, the transformer layer 424 is configured to apply the self-attention mechanism on the channel dimensions with the complexity of $O(C^2)$. The multi-head channel self-attention process is defined as:

$$\phi(Q_t, K_t, V_t) = \left(\sigma\left(\frac{Q_t^T K_t}{\epsilon}\right)\right) V_t$$

where $\phi(\cdot)$ denotes the self-attention operation, $Q_t$, $K_t$, $V_t \in R^{HW \times C}$ are the channel-wise reshaped query, key and value of transformer. $\sigma(\cdot)$ is the softmax function and $\in$ is the a learnable scaling parameter.

Following the conventional multi-head self-attention, the number of channels may be split into 'heads', in which the attention is executed in parallel. The results are concatenated for multi-head self-attention.

An objective function is only used for the image enhancer 202. An objective function is first used to train the image enhancer 202. Following the training the pre-trained image enhancer 202 may be embedded with memory mechanism. For example, the memory mechanism may be the image memory. The memory mechanism's weight may be fixed during memory reading and memory writing. The loss function for the image enhancer 202 is described below.

The structural similarity loss evaluates the closeness in terms of structural similarity for reconstruction, which can be formulated as follows:

$$\mathcal{L}_{ssim} = 1 - SSIM(\hat{I}, I_{gt})$$

where SSIM $(\cdot,\cdot)$ is structural similarity [2], I' is the enhanced image, and $I_{gt}$ denotes the referenced ground-truth image.

The distance between the deep features may be used as the constraint for better visual quality, which can be formulated as:

$$\mathcal{L}_{per} = \left\| \varphi(\hat{I}) - \varphi(I_{gt}) \right\|_2^2$$

where $\varphi_i(\cdot)$ is the process to extract deep features form a pre-trained network, e.g. a known low light image enhancement network.

The whole loss function is conducted by jointly considering the above loss and using the equation:

$$\mathcal{L} = \mathcal{L}_{ssim} + \mathcal{L}_{per}$$

Figure 7:
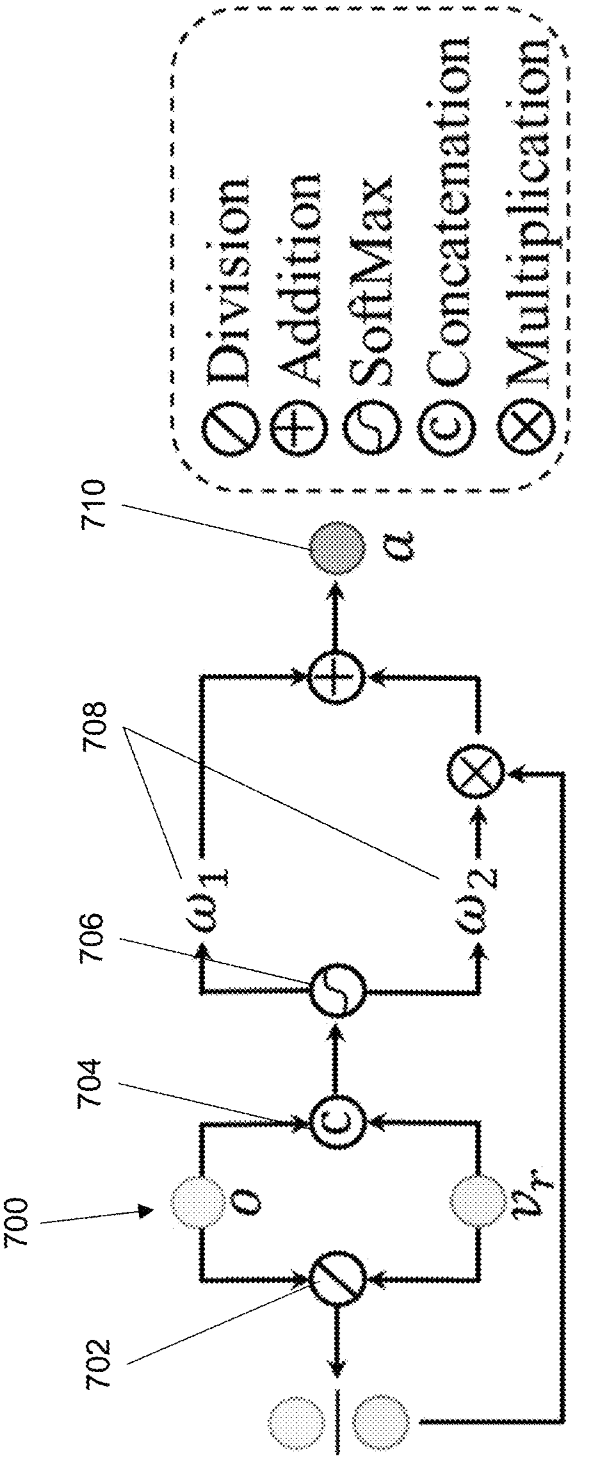
FIG. 7 illustrates the function of the adaptive fusion module performing adaptive fusion method; and, FIG. 8 is a block diagram illustrating an example method of the memory writing process.

Referring to FIG. 7, there is shown the functions of the adaptive fusion module 208. The adaptive fusion module 208 is configured to calculate a ratio of a sample specific property and the global average pooling data through element wise division. The adaptive fusion module 208 is further configured to concatenate the sample specific property and the global average pooling data, to generate a concatenated value. The adaptive fusion module 208 is further configured to determine one or more weight vectors by applying a softmax function to the concatenated value, and derive the adaptive adjustment factor based on the one or more weight vectors and the ratio of the sample specific property and global average pooling data.

In order to generate the adaptive adjustment factor, the adaptive fusion module 208 is configured to: multiply a first weight vector by the ratio of the sample specific property and global average pooling data and summing with a second weight vector. The first weight vector corresponds to the sample specific property and the second weight vector corresponds to the global average pooling data.

The exposure level of the enhanced images $\hat{I}$ may not be satisfactory i.e., the resolution may not be high enough due to the output from the image enhancer 202. The image enhancement processor 102 is configured to further adjust the enhanced results by using the response values accessed from the image memory. The learning network 200 is configured to provide adaptive adjustments for enhanced results without additional training. The image memory 120 stores sample specific properties of the entire training data which can be recalled during testing or operation. This avoids or reduces the chances of "forgetting" of the sample specific mapping.

After obtaining the enhance image $\hat{I}$ from the image enhancer 202 the information o from $\hat{I}$ can be generated from equation:

$$m = \frac{1}{|\mathcal{R}|} \sum_{(p,r)\in\mathcal{R}} I_{gt}(p, r, i)$$

FIG. 7 illustrates the function of the adaptive fusion module performing adaptive fusion method 700. Referring to FIG. 7, the adaptive fusion module 208 is configured to calculate the relationship between the memory value $v_r$ and the pooling information o. The response value $v_r$ and pooling information o are initially used to generate a ratio through element wise division at step 702. The response value $v_r$ and pooling information o may be concatenated by applying a concatenation at step 704. A softmax function is employed at step 706 to generate the weight from the concatenation of $v_r$ and o. The adaptive fusion module 208 is configured to calculate weights, at step 708 by using the following equation:

$$\begin{bmatrix} \omega_1 \\ \omega_2 \end{bmatrix} = \sigma\left(\begin{bmatrix} v_r \\ o \end{bmatrix}\right)$$

where $\omega_1$ and $\omega_2$ are the weight vector from $v_r$ and o, respectively.

At step 710 an adaptively adjustment factor a is derived in the adaptive adjustment module 208 by an addition function. The adaptive adjustment factor a is derived by applying:

$$a = \omega_1 \times \frac{v_r}{o} + \omega_2$$

The adaptive adjustment factor a may be used as an indicator to adjust the enhanced image without manual intervention by $\hat{I}_a = a \cdot \hat{I}$, where $\hat{I}_a$ is the final adjusted image.

A memory writing process is used to update the image memory 120. The image memory 120 is updated via the memory writing module 212. The memory writing process commences at the step of receiving the response value corresponding to the query feature. The next step comprises obtaining a desired memory value from processing a reference image. The method comprises the step of updating one or more memory keys within a dictionary using the response value. The one or more memory keys are updated if the difference between the response value and the desired memory value is within a threshold.

Figure 8:
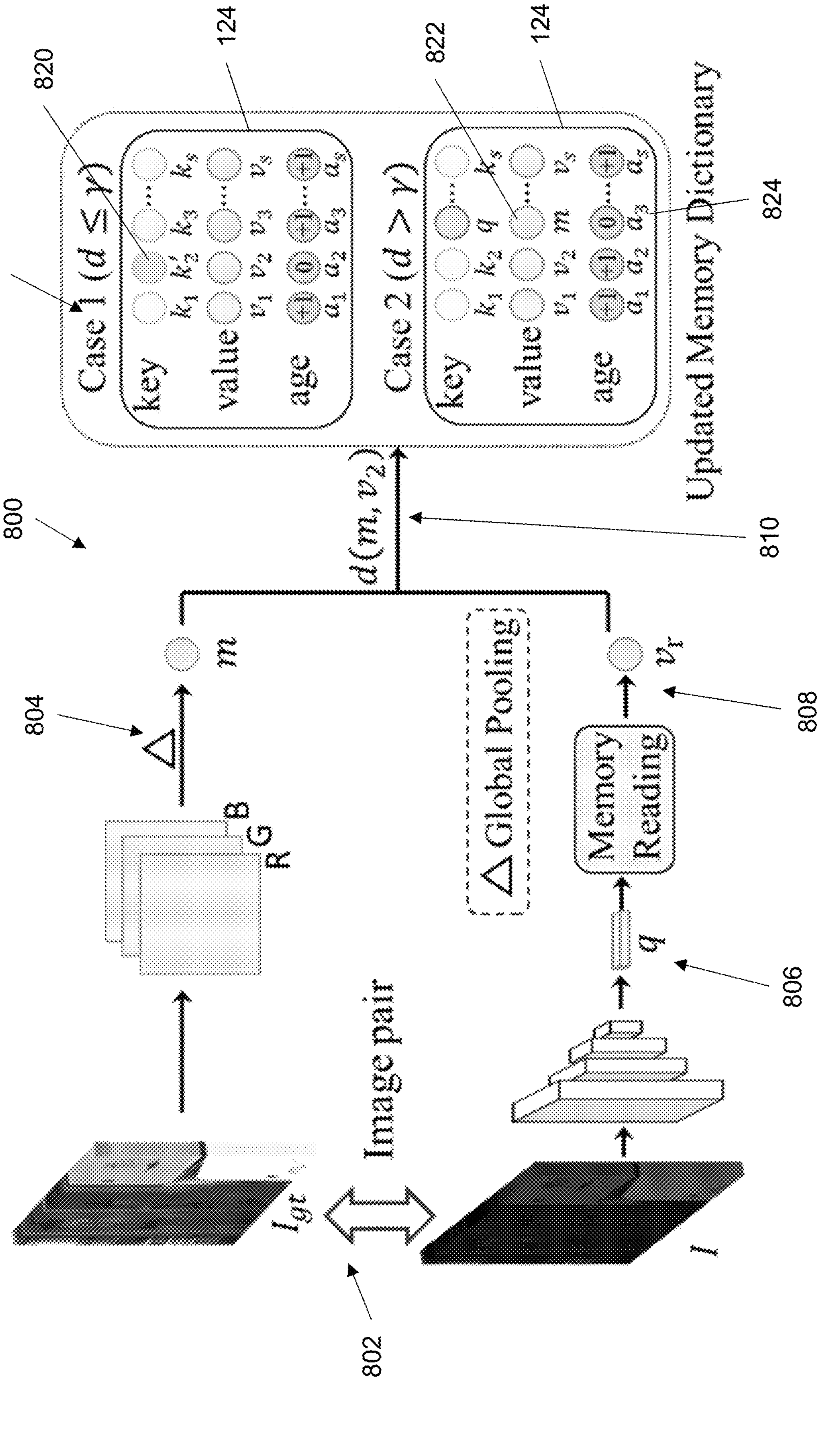

FIG. 8 illustrates an example method of memory writing process 800. The memory writing process is used to update the image memory 120 with new relationships between a low light image and normal light image. The memory writing process 800 may be used to create the memory dictionary (M) 124 from a training data set that includes low light images and corresponding normal light images. The memory writing process 800 may also be executed to update the image memory 120 to account for new data.

The image memory 120 is updated when a response value $v_r$ and the desired memory m are obtained during the training stage. The memory m defines data regarding the normal light image. Step 802 comprises receiving an image pair. The image pair comprises a low light image I and a normal light image (i.e., high resolution image) $I_{gt}$. The desired memory is m is computed, at step 804, from the reference image $I_{gt}$ (i.e., a ground truth image) by taking average of each channel as:

$$m = \frac{1}{|\mathcal{R}|} \sum_{(p,r)\in\mathcal{R}} I_{gt}(p, r, i)$$

where m is the global average value of the region R.

$I_{gt}$(p,r,i) denotes the pixel value located at (p,q) associated with the i-th channel in the image size region R=H×W, where H and W are the height and weight size of the referenced ground-truth image $I_{gt}$, respectively. The desired memory value is obtained and defined as $m \in R^{1\times1\times cm}$, where $c_m$=3 for RGB images.

The low light image may be processed by a feature generator 204 at step 806. The feature generator output (i.e., a query feature q) is used by the memory reading module 206 to identify a response value $v_r$ at step 808

The image memory 120 may be updated in two different cases, depending on whether the distance d between the response value $v_r$ and the desired memory value m is within the threshold γ or not. The distance d is calculated at step 810 using the following equation:

$$d(m, v_r) = \frac{1}{c_v}\sum_{1}^{c_v}|v_r - m|$$

where $c_v$ is the dimension of $v_r$ and m.

At step 812 the first case is shown. In case 1 if $d(m, v_r) \leq \gamma$, it means that the value of memory is correct and only the key is updated by taking the average of the current key $k_r$ and the query q. The updated key is shown as feature 820 in the memory dictionary 124 and labelled as k'. After updating for the r-th item, the age of $a_r$ is reset to zero:

$$k_r \leftarrow \frac{k_r + q}{2}, a_r \leftarrow 0.$$

At step 814 the second case is shown. In case 2 if $d(m, v_r) > \gamma$, it indicates that the current value of memory does not match the desired memory. In this case, a new place in the dictionary 124 may be randomly selected to write the pair (q,m). The way to select a new place is to find the memory item with the oldest age. Assuming the oldest memory item is $(k_{old}, v_{old}, a_{old})$, then the updating is performed as:

$$k_{old} \leftarrow q, v_{old} \leftarrow m, a_{old} \leftarrow 0.$$

The updated memory dictionary is illustrated with the new memory item 822 m and the age 824 is updated to 0 as shown at age $a_3$.

Besides the updated memory items, the age of non-updated memory items will be increased by 1 in each round of updates. After training, the updated memory dictionary 124 (M) is configured to store the paired information of the low-light images in memory key K and its corresponding normal-light images in memory value V. The memory dictionary 124 (M) is updated with new response values that can be used to re-enhance low light images outputted from image enhancer 202 in the learning network 200.

The system 100 and method 300 for image enhancement, in particular for low light image enhancement as described herein can be used in scenes that require low light enhancement such as in night photography, backlit photography, road surveillance or terrain surveillance e.g., by a drone or vehicle capturing images. The system 100 may be implemented in a smartphone or camera or other image capture devices that can be mounted on the drone or vehicle.

The system 100 including an external image memory 120 to store the sample specific properties of the entire training is advantageous as the stored data can be recalled during testing and during image enhancement to re-enhance low light images. The image memory 120 can provide adaptive adjustments to testing samples and or other low light images. The image memory 120 being a plug and play mechanism is further advantageous as it can be integrated with existing image enhancement devices or systems to further improve the enhancement quality. The image memory 120 stores response values i.e., the relationship between low light images and normal light images. The stored response values can be used for further re-enhancement. The learning network 20 as described herein is advantageous because it provides an improved image enhancement network as it applies the stored relationship from the image memory 120.

The proposed external image memory 120 is designed as a plug-and-play mechanism that can be integrated with any existing enhancement system during testing to further improve the enhancement quality. This is quite useful as the stored relationship between normal images and low light image from a training dataset can be used in any image enhancement systems. The learning network is further advantageous as the image memory 120 is used to further enhance the enhanced images from the pre trained image enhancer.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

Any reference to prior art contained herein is not to be taken as an admission that the information is common general knowledge, unless otherwise indicated.

One or more of the components and functions illustrated the figures may be rearranged and/or combined into a single component or embodied in several components without departing from the scope of the invention. Additional elements or components may also be added without departing from the scope of the invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A computer implemented method of image enhancement comprising the steps of:

receiving an input image, wherein the input image is a low light image, processing the input image, by a pre trained image enhancer, to generate an initial enhanced image, accessing, from an image memory, a response value corresponding to a sample specific property of a normal image, generating an adjustment factor based on the response value from the image memory, generating a final enhanced image by applying the adjustment factor to the initial enhanced image.

2. A computer implemented method of image enhancement in accordance with claim 1, wherein the adjustment factor is generated based on combining the response value with global average pooling data related to the initial enhanced image.

3. A computer implemented method of image enhancement in accordance with claim 1, wherein the adjustment factor is generated by applying an adaptive fusion function.

4. A computer implemented method of image enhancement in accordance with claim 3, wherein applying an adaptive fusion function comprises:

calculating a ratio of a sample specific property calculating a global average pooling data through element wise division, concatenating the sample specific property and the global average pooling data, to generate a concatenated value, determining one or more weight vectors by applying a softmax function to the concatenated value, deriving the adaptive adjustment factor based on the one or more weight vectors and the ratio of the sample specific property and global average pooling data.

5. A computer implemented method of image enhancement in accordance with claim 4, wherein the step of deriving the adaptive adjustment factor comprises multiplying a first weight vector by the ratio of the sample specific property and global average pooling data and summing with a second weight vector, wherein the first weight vector corresponds to the sample specific property and the second weight vector corresponds to the global average pooling data.

6. A computer implemented method of image enhancement in accordance with claim 1, comprising additional steps of:

processing the input image, by a feature generator, to generate a query feature, accessing the response value, from the image memory, based on the query feature.

7. A computer implemented method of image enhancement in accordance with claim 6, comprising the steps of:

identifying a memory key that corresponds to the query feature, within the image memory, identifying a response value that corresponds to the identified memory key, accessing the response value from a memory address of the image memory that corresponds to the memory key.

8. A computer implemented method of image enhancement in accordance with claim 7, wherein the memory key is identified from a plurality of memory keys, by computing the cosine similarity between the query and the plurality of memory keys to identify the memory key that has the closest cosine similarity to the query.

9. A computer implemented method of image enhancement in accordance with claim 1, wherein the step of processing the input image by the image enhancer comprises the steps of:

the input image is fed into a first convolution layer, extracting one of more low-level features by processing the input image by the first convolution layer, wherein each low level feature is defined by a size that comprises spatial dimensions and a number of channels, the one or more low level features are passed through a 4-level symmetric encoder-decoder, generating an initial enhanced image from the 4-level symmetric encoder-decoder.

10. A computer implemented method of image enhancement in accordance with claim 1, wherein the method comprises a memory writing process comprising the steps of:

receiving the response value corresponding to the query feature, obtaining a desired memory value from processing a reference image, updating one or more memory keys within a dictionary using the response value, the one or more memory keys are updated if the difference between the response value and the desired memory value is within a threshold.

11. The computer implemented method of image enhancement in accordance with claim 1, wherein the method is applied to low light images to enhance the low light images, and the image memory comprises a plug and play mechanism for integration into an image enhancement method.

12. A system for image enhancement comprising:

an image enhancement processor, an image memory arranged in communication with the image enhancement processor, the image memory defining a memory dictionary, the memory dictionary comprising one or more memory keys and one or more response values, each memory key corresponding to a response value, wherein the response value corresponds to a value from a normal image, wherein the image enhancement processor is configured to:

receive an input image, wherein the input image is a low light image, process the input image, by a pre trained image enhancer, to generate an initial enhanced image, access, from the image memory, a response value corresponding to a sample specific property of a normal image, generate an adjustment factor based on the response value from the image memory, output a final enhanced image by applying the adjustment factor to the initial enhanced image.

13. A system for image enhancement in accordance with claim 12, wherein the image enhancement processor comprising a learning network, the learning network comprising:

a pre trained image enhancer adapted to receive one or more input images and generate the initial enhanced image, a pre-trained feature generator configured to receive the one or more input images and generate a query feature based on feedforwarding the one or more input images into the feature generator, a memory reading module configured to receive the query feature and access the response value from the image memory based on the received query feature, an adaptive fusion module configured to receive the response value and generate the adjustment factor based on the response value, an output module configured to apply the adjustment factor to the initial enhanced image and output the final enhanced image.

14. A system for image enhancement in accordance with claim 13, wherein image enhancement processor is configured to generate global average pooling data from the initial enhanced image, the adaptive fusion module is configured to:

receive global average pooling data and a response value from the memory reading module generate the adjustment factor based on combining the response value with global average pooling data related to the initial enhanced image, and; wherein the adaptive fusion module is configured to apply an adaptive fusion function to generate the adjustment factor.

15. A system for image enhancement in accordance with claim 14, wherein the adaptive fusion module is further configured to:

calculate a ratio of a sample specific property and the global average pooling data through element wise division, concatenate the sample specific property and the global average pooling data, to generate a concatenated value, determine one or more weight vectors by applying a softmax function to the concatenated value, derive the adaptive adjustment factor based on the one or more weight vectors and the ratio of the sample specific property and global average pooling data.

16. A system for image enhancement in accordance with claim 15, wherein the adaptive fusion module, as part of generating the adaptive adjustment factor, is configured to:

multiply a first weight vector by the ratio of the sample specific property and global average pooling data and summing with a second weight vector, wherein the first weight vector corresponds to the sample specific property and the second weight vector corresponds to the global average pooling data.

17. A system for image enhancement in accordance with claim 16, wherein the image enhancer is a pre-trained transformer based image enhancer comprising a symmetric encoder—decoder comprising four level pyramid feature maps with skip connections.

18. A system for image enhancement in accordance with claim 13, wherein the memory reading module is further configured to:

identify a memory key that corresponds to the query feature, within the image memory, identify a response value that corresponds to the identified memory key, access the response value from a memory address of the image memory that corresponds to the memory key.

19. A system for image enhancement in accordance with claim 18, wherein the memory reading module is configured to:

compute the cosine similarity between the query and the plurality of memory keys, identify the memory key from a plurality of memory keys based on the output of the cosine similarity computation, wherein the memory key is identified as the memory key having the closest cosine similarity to the query.

20. A system for image enhancement in accordance with claim 19, wherein the image enhancer is further configured to:

feed the received input image into a first convolution layer, process the input image by applying the first convolution layer, extract one or more low level features based on the processing in the first convolution layer, wherein each low level feature is defined by a size that comprises spatial dimensions and a number of channels, pass the one or more low level features are through a 4-level symmetric encoder-decoder, generate an initial enhanced image from applying the 4-level symmetric encoder-decoder.

* * * * *